US011429152B2

(12) United States Patent
Sharma et al.

(10) Patent No.: US 11,429,152 B2
(45) Date of Patent: Aug. 30, 2022

(54) ADAPTIVE INTELLIGENCE ENABLED SOFTWARE PROVIDING EXTENSIBILITY AND CONFIGURATION FOR LIGHT PROJECTION TECHNOLOGY BASED KEYBOARDS

(71) Applicant: Dell Products L. P., Round Rock, TX (US)

(72) Inventors: Rohan Sharma, Delhi (IN); Shubham Gupta, Jaipur (IN); Rangan Basu, Gurgaon (IN)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 16/909,226

(22) Filed: Jun. 23, 2020

(65) Prior Publication Data

US 2021/0397225 A1    Dec. 23, 2021

(51) Int. Cl.
*G06F 3/02* (2006.01)
*G06F 1/16* (2006.01)
*G06N 20/00* (2019.01)
*G06F 3/023* (2006.01)

(52) U.S. Cl.
CPC .......... *G06F 1/1673* (2013.01); *G06F 3/0238* (2013.01); *G06N 20/00* (2019.01)

(58) Field of Classification Search
CPC .... G06F 1/1673; G06F 3/0238; G06F 3/0202; G06N 20/00; H01H 13/70
USPC ........................................ 345/169, 168, 170
See application file for complete search history.

(56) References Cited

U.S. PATENT DOCUMENTS

| 2007/0063979 | A1* | 3/2007 | Tran | G06F 1/1639 |
| | | | | 345/169 |
| 2016/0366272 | A1* | 12/2016 | Pu | H04W 4/14 |
| 2016/0370927 | A1* | 12/2016 | Fang | G06F 1/1616 |
| 2017/0277428 | A1* | 9/2017 | Murayama | G06F 3/03547 |
| 2018/0074607 | A1* | 3/2018 | Zhang | H04W 4/60 |

(Continued)

OTHER PUBLICATIONS

Basu, Rangan et al., U.S. Appl. No. 16/708,702; entitled "Keyboard Having Keys with Configurable Surface Displays"; filed Dec. 10, 2019; Client Ref. 11755301; consisting of specification and drawings totaling 27 pages.

*Primary Examiner* — Thuy N Pardo
(74) *Attorney, Agent, or Firm* — Krishnendu Gupta; Deepika Bhayana; Derek Lam

(57) ABSTRACT

At least one embodiment of the disclosed system is directed to a computer-implemented method for operating a light projection technology keyboard of an Information Handling System. The computer-implemented method may include receiving electronic environmental condition data at a keyboard configuration system, and processing the electronic environmental condition data through a neural network of an adaptive configuration engine. The neural network may output one or more functions and/or visual settings to be used in configuring operation of the light projection technology keyboard. The light projection technology keyboard may be controlled based on the one or more functions and/or visual settings output by the neural network. Other embodiments of this aspect include corresponding computer systems, apparatus, and computer programs recorded on one or more computer storage devices, each configured to perform the actions of the methods.

20 Claims, 8 Drawing Sheets

(56) References Cited

U.S. PATENT DOCUMENTS

| | | | |
|---|---|---|---|
| 2018/0136752 A1* | 5/2018 | Sharma | H04N 9/3194 |
| 2020/0272244 A1* | 8/2020 | Autio | G06F 3/0238 |
| 2020/0356183 A1* | 11/2020 | Kamepalli | G06F 3/021 |
| 2021/0110018 A1* | 4/2021 | Rowe | G06V 40/172 |
| 2021/0173447 A1* | 6/2021 | Ku | G06F 1/1643 |
| 2021/0365128 A1* | 11/2021 | de la Garza Villarreal | G06F 3/0426 |

* cited by examiner

ADAPTIVE INTELLIGENCE ENABLED SOFTWARE PROVIDING EXTENSIBILITY AND CONFIGURATION FOR LIGHT PROJECTION TECHNOLOGY BASED KEYBOARDS

BACKGROUND OF THE INVENTION

Field of the Invention

The present disclosure relates to light projection technology based keyboards and, more particularly, to adaptive intelligence-enabled software providing extensibility and configuration for such keyboards.

Description of the Related Art

As the value and use of information continue to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much data is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. Also, information handling systems may include a variety of hardware and software components that may be configured to process, store, and communicate information and may include one or more computer systems, data storage systems, and networking systems.

Many IHS receive textual and other command inputs from users via a keyboard. A keyboard may be integral with such a device (as in a laptop computer) or separate from, but connected to the device (as in a wired USB keyboard or a wireless Bluetooth keyboard). The surfaces of typical keyboards typically include printing identifying the letter that will be input upon the actuation of the key. Further, the functions associated with the keys on a keyboard generally are fixed and not readily reconfigured (e.g., F1-F10, Ctrl, Alt, etc.).

SUMMARY OF THE INVENTION

A system of one or more computers can be configured to perform particular operations or actions by virtue of having software, firmware, hardware, or a combination of them installed on the system that in operation causes or cause the system to configure a light projection technology keyboard in response to environmental conditions. At least one embodiment is directed to a computer-implemented method for operating a light projection technology keyboard of an information handling system. The computer-implemented method may include receiving electronic environmental condition data at a keyboard configuration system, and processing the electronic environmental condition data through a neural network of an adaptive configuration engine. The neural network may output one or more functions and/or visual settings to be used in configuring operation of the light projection technology keyboard. The light projection technology keyboard may be controlled based on the one or more functions and/or visual settings output by the neural network. Other embodiments of this aspect include corresponding computer systems, apparatus, and computer programs recorded on one or more computer storage devices, each configured to perform the actions of the methods.

In certain embodiments, the one or more functions and/or visual settings provided by the neural network may include: 1) functions assigned to keys of the light projection technology keyboard; 2) visual indicia that are to be projected onto visible surfaces of the keys of the light projection technology keyboard; 3) placement of the visual indicia projected onto the visible surfaces; 4) color of the visual indicia projected onto the visible surfaces; 5) background color projected onto the visible surfaces; 6) brightness of the visual indicia and/or key background projected onto the visible surfaces; and contrast between the visual indicia projected onto the visible surface and a key background projected onto the visible surfaces. The electronic environmental condition data may include: 1) data relating to ambient lighting conditions in an environment in which the information handling system is operating, where the data relating to the ambient lighting conditions is based on light detected by one or more light sensors in an ambient light sensing system; 2) data relating to a network environment in which the information handling system is operating, where the data relating to the network environment is based on a wired network and/or Wi-Fi identifier; 3) data relating to identification of a location in which the information handling system is operating; and 4) data relating to an application actively running on the information handling system.

Certain embodiments of the keyboard configuration system may include a user configuration engine, where the user configuration engine allows a user to enter functions and/or visual settings of the keys of the light projection technology keyboard. The functions and/or visual settings of the keys of the light projection technology keyboard that may be configured by the user may include: 1) functions assigned to keys of the light projection technology keyboard; 2) visual indicia that are to be projected onto visible surfaces of the keys of the light projection technology keyboard; 3) placement of the visual indicia projected onto the visible surfaces; 4) color of the visual indicia projected onto the visible surfaces; 5) background color projected onto the visible surfaces; 6) brightness of the visual indicia and/or key background projected onto the visible surfaces; and 7) contrast between the visual indicia projected onto the visible surface and a key background projected onto the visible surfaces.

In certain embodiments of the disclosed system, one or more functions and/or visual settings output by the neural network are modified using the user configuration engine. The modifications to the functions and/or visual settings made by the user and the corresponding environmental conditions may be stored in storage media of the information handling system. In certain embodiments, the modifications and corresponding environmental conditions are uploaded from the information handling system to a server, which tunes the neural network using the modifications and corresponding environmental data at the server. The tuned neural network may be downloaded to the information handling system for use by the adaptive configuration engine of the keyboard configuration system.

BRIEF DESCRIPTION OF THE DRAWINGS

The manner and process of making and using the disclosed embodiments may be appreciated by reference to the drawings, in which.

DETAILED DESCRIPTION

Figure 1:
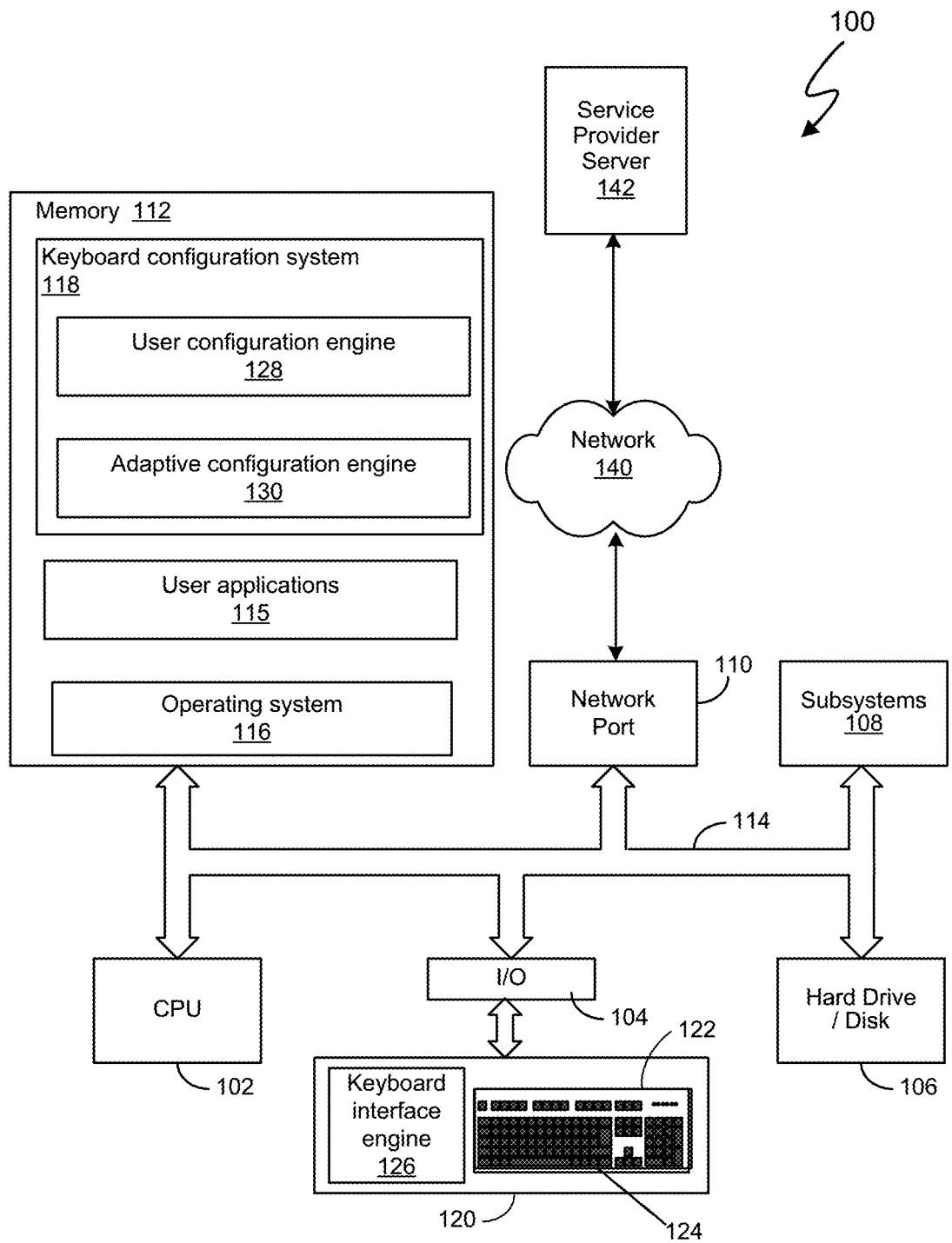
FIG. 1 depicts an information handling system that may be used to implement certain embodiments of the disclosed system.

The vast majority include keyboards include keys that are printed with fixed symbols having fixed input functions, which can lead to a limited user experience. Various computer users, such as software developers, gamers, and visually-impaired users, may have different preferences for key function, with the latter group often preferring to use specialized keyboards. Additionally, computer users who wish to input text in different languages may struggle to use the same keyboard, especially if that keyboard is integral with the device.

Certain embodiments of the disclosed system have been implemented with the recognition that using different specialized keyboards having printed keys increases the cost and inconvenience of using the IHS. To this end, rather than using text printed on keys of a keyboard, certain embodiments use light projection technology to project software configurable visual indicia onto the keys. Further, certain embodiments of the disclosed system have been implemented with the recognition that configurations of keyboard settings in one environment may not be optimal in other environments. Accordingly, certain embodiments include adaptive intelligence-enabled software that automatically adjusts visual settings and functions of the keys of the keyboard in response to changes in the environment (e.g., changes in ambient light, changes in location data, changes in network data, changes in running application, changes and typing speed, etc.). Still further, certain embodiments allow a user to locally adjust keyboard configuration visual settings to their liking.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a trackpad, a touchscreen and a display device (including a touch-sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid-state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system (IHS) 100 that can be used to implement the disclosed system and method. The IHS 100 includes a processor (e.g., central processor unit or "CPU") 102, input/output (I/O) interface 104 (e.g., a wireless Bluetooth I/O Port), a storage system 106, and various other subsystems 108. In various embodiments, the IHS 100 also includes network port 110 operable to connect to a network 140, which is likewise accessible by a service provider server 142. The IHS 100 likewise includes system memory 112, which is interconnected to the foregoing via one or more buses 114. System memory 112 further includes an operating system (OS) 116 and various user applications 115. In certain embodiments, the system memory 112 includes a keyboard configuration system 118. In one embodiment, the information handling system 100 is able to download the keyboard configuration system 118 from the service provider server 142. In another embodiment, the keyboard configuration system 118 is provided as a service from the service provider server 142. Further, as will be set forth herein, the service provider server 142 may be configured to retrieve data from the keyboard configuration system 118 to update the hyperparameters of a neural network employed in the keyboard configuration system 118.

The exemplary IHS 100 shown in FIG. 1, has a keyboard system 120 with a keyboard 122. The keyboard 122, in turn, has mechanical keys 124 with configurable surface displays that use light projection technology to project visual indicia on the surface of the keys 124. In the exemplary system described herein, the keyboard system 120 displays configurable symbols (such as language graphemes, images, etc.) on each of its keys 124 as an actively-lit image that is configured using commands received from the keyboard configuration system 118. A keyboard interface engine 126 can be used to facilitate communication between the keyboard system 120 and the keyboard configuration system 118. In some embodiments, the keyboard system 120 is a separate physical component within the IHS 100, and communicates with the keyboard configuration system 118 over a wired USB interface or a wireless Bluetooth port I/O 104. In other embodiments, the keyboard system 120 is integral with other components of the IHS 100, for example, when the IHS 100 is a laptop computer. Without limitation, the disclosed system may be used with integral keyboard systems, separate keyboard systems, etc.

The example of the keyboard configuration system 118 shown in FIG. 1 includes a user configuration engine 128 and an adaptive configuration engine 130. In certain embodiments, a user may set the functions and appearance of the keys 124 on the keyboard 122 directly through the user configuration engine 128. In certain embodiments, the adaptive configuration engine 130 employs adaptive intelligence to automatically set the functions and appearance of the keys 124 on the keyboard 122 based on environmental inputs, as described herein.

Figure 2:
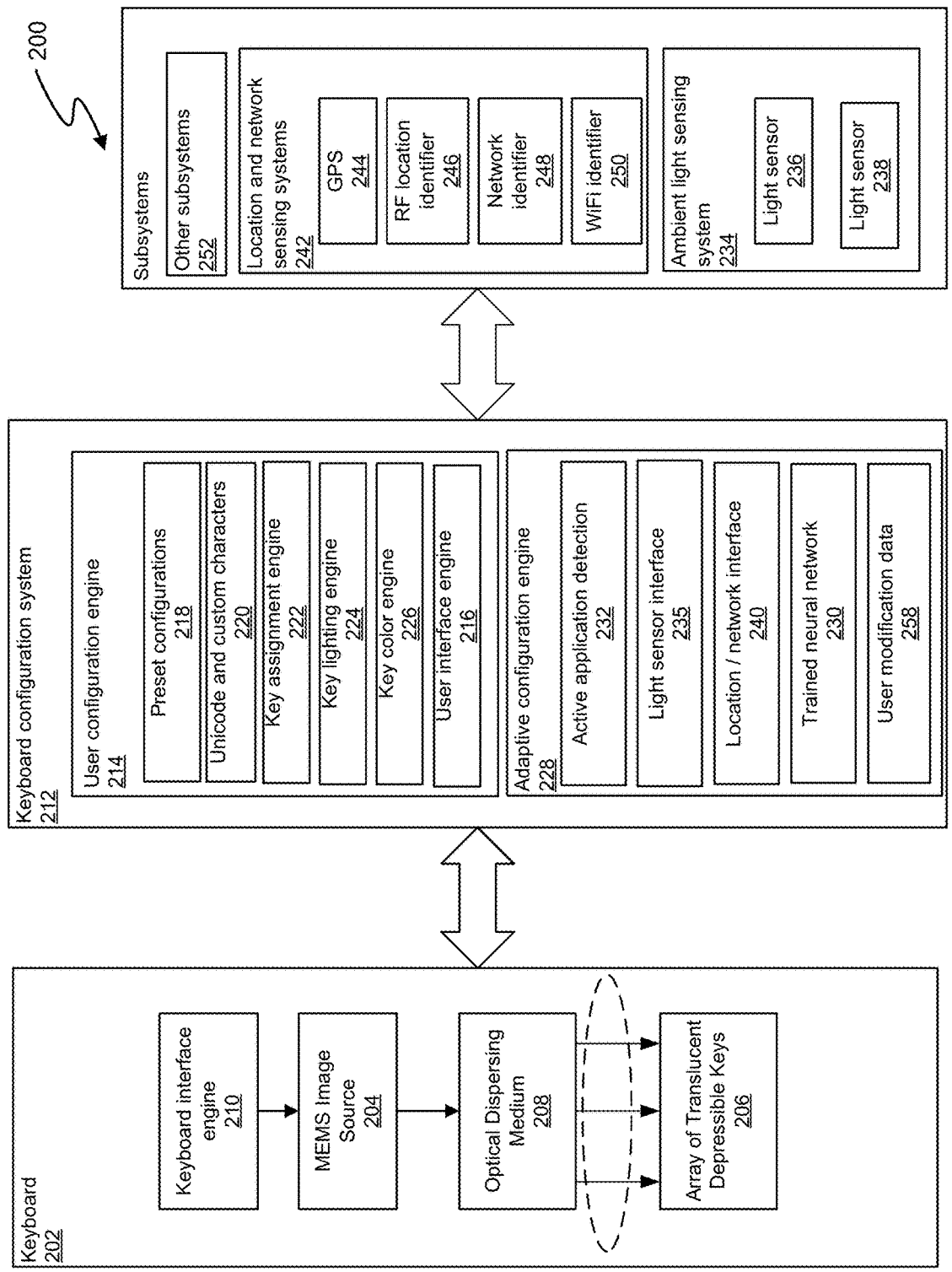
FIG. 2 schematically shows more detail of an IHS according to an exemplary embodiment of the disclosed system, including a keyboard having keys with configurable surface displays and a keyboard configuration system.

FIG. 2 is a schematic diagram of one embodiment 200 of the disclosed system showing one example of the relationship between various components of the IHS 100. In this example, the keyboard 212 is described with reference to a microelectromechanical system (MEMS) technologies. However, it is appreciated that technologies other than MEMS may be used to implement the concepts, techniques, and structures disclosed herein. For example, nanoelectromechanical systems (NEMS) may be used in place of MEMS wherever the latter is referenced. Thus, embodiments are described in connection with MEMS and not meant to limit the scope of the subject matter of the disclosed system.

In the example shown in FIG. 2, the keyboard 202 includes at least one microelectromechanical system (MEMS) image source 204 that creates and projects images to be displayed on an array of translucent, depressible keys 206. In one embodiment, each MEMS image source 204 includes a laser system for producing a laser beam, and a scanning mirror for scanning the produced laser beam to generate a 2D image. The 2D image itself may include portions to be displayed on multiple keys 206. Thus, the keyboard 202 may include an optical dispersing medium 208 to segment and/or route multiple portions of the 2D image to different keys for display of one portion on each key. The optical dispersing medium 208 may include beam splitters, optical waveguides, converging or diverging lenses, or other structures suitable for dispersing the image in the desired manner. The structure and operation of a MEMS image source 204 are explained below in connection with FIG. 3, while the structure and operation of the depressible keys 206 are explained below in connection with FIG. 4.

In certain embodiments, the keyboard 202 may include multiple MEMS image sources 204 depending, for example, on the total number of keys 206, a desired number of pixels to be displayed on each key, and the number of pixels capable of production by each scanning mirror. In some embodiments, one or more of the MEMS image sources 204 may include a laser system having multiple diode lasers that output differently-colored laser beams. Such a MEMS image source 204 includes a scanning mirror that scans each laser beam to produce color pixels, so some or all of the portions of the generated 2D image may contain pixels of any desired color. It is appreciated that in embodiments having multiple MEMS image sources 204, some of the MEMS image sources 204 may be unicolor and some of the MEMS image sources 204 may be multicolor, depending on which keys 206 of the keyboard 202 are desired to be capable of displaying only monochrome images and which keys 206 are desired to be capable of displaying full-color images.

Certain embodiments of the disclosed system include a keyboard interface engine 210. In certain embodiments, the keyboard interface engine 210 is configured to communicate with a keyboard configuration system 212. The keyboard configuration system 212 transmits keyboard configuration commands to the keyboard interface engine 210 in the manner described herein. Commands received by the keyboard interface engine 210 from the keyboard configuration system 212, in turn, direct the MEMS image source 204 to produce a desired 2D image for display on one or more of the keys 206. Further, in certain embodiments, the keyboard configuration system 212 may associate each image for display on the keys 206 with a corresponding function. In certain embodiments, the keyboard interface engine 210 may store the functions of the keys 206 locally, where the functions are based on commands received from the keyboard configuration system 212. In certain embodiments, the functions of the keys 206 may be stored remotely from the keyboard 202 in other locations within the IHS 100 so that the function of a key 206 is retrieved from the storage when the key is pressed. For example, if it is desired for a particular key 206 to display the letter "L," then the keyboard interface engine 210, the keyboard configuration system 212, or other keyboard I/O, associates a press of that key to a function associated with the letter "L" (which may be to cause a currently executing application to receive this letter as input). In other instances, a multi-key function may be associated with pressing the letter "L" on the keyboard 206 (e.g., Fn+1+0).

In certain embodiments, a spinning mirror, or similar device in the MEMS image source 204 for generating an output 2D image, may be configured to display any arbitrary image. Thus, in various embodiments, the keyboard configuration system 212 may direct the keyboard interface engine 210 to control the MEMS image source 204 to choose the 2D image as a function of any number of considerations. In case a language input is desired, the keyboard configuration system 212 may provide a default for configurable settings for displaying a 2D image having characters with a given language, font, color, and according to a key layout (e.g., QWERTY, Dvorak, Brahmic, Arabic, Cyrillic, Hangul, and so on). In case a particular application has functions that a user desires to map to specific keys, the keyboard configuration system 212 may allocate certain symbols to those keys, permitting those functions to be performed without complex key-combination, mouse inputs, or navigating complex menu systems. For example, a financial analyst may desire to input a currency symbol € or ¥ by pressing a single key, in which case he or she may use the keyboard configuration system 212 to configure a desired key to have this function and display the corresponding symbol. Likewise, a gamer may desire to input a particular gaming function by pressing a single key, and operate the keyboard configuration system 212 to configure the keyboard 202 in response to pressing the single key.

FIG. 2 also shows one embodiment of the components that may be used in the keyboard configuration system 212. In this embodiment, the keyboard configuration system 212 includes a user configuration engine 214. A user may interact with the user configuration engine 214 through, for example, a user interface engine 216 to control various features of the keys 206. To this end, the user configuration engine 214 may include one or more preset configurations 218 from which the user may select a configuration suitable for the user's tasks and environment. In certain embodiments, the preset configurations may be default configurations. Additionally, or in the alternative, the preset configurations may be configurations that have been customized and saved by the user.

Certain embodiments of the user configuration engine 214 may allow a user to program the features and functions of the keys 206 on a granular level. To this end, the user configuration engine 214 may include a data store 220 of Unicode, fonts, custom characters, and/or custom images that may be selected by the user for display on one or more of the keys 206. In certain embodiments, the user may assign specific functions to the keys 206 using a key assignment engine 222. In certain embodiments, the user may set the lighting and color of individual keys and using the key lighting engine 224 and key color engine 226, respectively. In certain embodiments, the lighting and color of the keys 206 may be set on a global basis using the key lighting engine 224 and key color engine 226, respectively.

The keyboard configuration system is shown in FIG. 2 also employs an adaptive configuration engine 228, which can configure the visual settings and functions of the keys 206 based on various environmental conditions. In certain embodiments, the adaptive configuration engine 228 provides keyboard configuration data to the keyboard 202 through the user configuration engine 214. In such instances, the user may modify the functions and visual settings provided by the adaptive configuration engine 228 through the user interface of the user configuration engine 214. Additionally, or in the alternative, the adaptive configuration engine 228 may operate to provide keyboard configuration data directly to the keyboard 202 through its interface engine. In certain embodiments, whether the adaptive configuration engine 228 is allowed to automatically change functions and visual settings of the keys 206 of the keyboard 202 may be selectively enabled or disabled by the user.

The adaptive configuration engine 228 may automatically set the keyboard visual settings (e.g., brightness, color, contrast, images, and characters, etc.) and functions (programmed key sequences, programmed simultaneous key presses, etc.) in response to a variety of environmental conditions. In the example shown in FIG. 2, the adaptive configuration engine 228 includes a trained neural network 230 that intelligently provides functions and visual settings that are to be used by the keyboard 202 under various environmental conditions.

The keyboard configuration controller 241 further may be configured to control the MEMS image source 221 to display a 2D image based on a particular application currently executing in the IHS 100. Thus, when a first application (such as a word processor) executes, the keyboard configuration controller 241 may control the MEMS image source 221 to display a standard keyboard layout. However, when a second application (such as a game) executes, the keyboard configuration controller 241 may control the MEMS image source 221 to display a gaming keyboard layout. Thus, the keyboard configuration system 212 may apply an artificial intelligence (AI) algorithm, such as a maximum likelihood (ML) algorithm using a neural net, to determine an optimal brightness, font, character size, or other feature of the image to be displayed by the MEMs image source 204 on each key as a function of the environmental conditions.

The adaptive configuration engine 228 of this example includes an active application detection module 232, which detects the application (e.g., spreadsheet, word processor, game) that is currently in active use by the user in the IHS 100. The particular output of the active application detection module 232 may be provided to an input of the trained neural network 230, in the manner described herein, and used with other environmental conditions to intelligently set functions and visual settings of the keyboard 202. The keyboard configuration system 212 may be configured to control the MEMS image source 204 to display a 2D image based on a particular application currently executing in the IHS 100. Thus, when a first application (such as a word processor) executes, the keyboard configuration system 212 may control the MEMS image source 204 to display a standard keyboard layout. However, when a second application (such as a game) executes, the keyboard configuration system 212 may control the MEMS image source 204 to display a gaming keyboard layout.

The adaptive configuration engine 228 may also automatically set the keyboard visual settings and functions in response to ambient light conditions. In one example, ambient light is detected by an ambient light sensing system 234 having one or more lights sensors 236 and 238. Existing image sensors, such as those included in a laptop camera, a WebCam, etc. may be employed to detect the ambient lighting conditions. Additionally, or in the alternative, a light sensor that is independent of existing image sensors may be employed. The output of the ambient light sensing system 234 may be provided to a light sensor interface 235, which provides a vector corresponding to the amount of ambient light to an input of the trained neural network 230. Thus, for example, a camera may continuously or intermittently detect an ambient brightness, and the keyboard configuration system 212 may responsively and dynamically increase or decrease the brightness, contrast, or character size or change a font to adapt to changing brightness levels, colors, hues, etc., in the ambient environment.

The adaptive configuration engine 228 may also set the visual settings and functions of the keys 206 of the keyboard 202 based on the location of the IHS 100 and/or network to which the IHS 100 is connected. To this end, the adaptive configuration engine 228 includes a location/network interface module 240 that receives location and network information from location and network sensing systems 242. In the exemplary embodiment shown in FIG. 2, the location and network sensing systems 242 may include a GPS system 244, which provides the global location of the IHS 100. In RF location identifier 246 may include an RF transmitter and/or receiver that communicates with a local RF network to determine the location of the IHS 100 within, for example, a manufacturing facility, a development facility, and/or any other work facility in which the IHS 100 is employed. In certain embodiments, the functionality of the IHS 100 and/or the keyboard 202 may vary depending on where the IHS 100 is located. Based on changes in location, any preconfigured settings, settings recommended by the engine may automatically be picked up and applied. For example, if the identified location is that of the usual workplace/workroom then the most preferred keyboard layout (font size, background color) may automatically be applied.

Network detection information may be provided to the location/network interface module 240 by, for example, the location and network sensing systems 242. In certain embodiments, the location and network sensing systems 242 include a network identifier module 248 that is configured to identify the network to which the IHS 100 is connected. Additionally, or in the alternative, network detection information may be provided by a Wi-Fi identifier module 250 that is configured to identify the name of the Wi-Fi to which the IHS 100 is connected. In certain embodiments, the network identifier module 248 and/or Wi-Fi identifier module 250 may correspond to a location in which the IHS 100 is currently operating. In other embodiments, in response to changes in network location, any preconfigured settings, settings recommended by the engine may automatically be picked up and applied. For example, if the network identified is that of the usual workplace/workroom then the most preferred keyboard layout (font size, background color) may automatically be applied.

The adaptive configuration engine 228 may also receive data from other subsystems 252. Data received from subsystems 252 may be provided, for example, as one or more vectors to the input of the trained neural network 230. Examples of other subsystems 252 include face recognition systems, fingerprint identification systems, and other biometric sensing systems that verify the identity of the user of the IHS 100. As an example, the trained neural network 230 may set different functions and visual settings of the keyboard 202, at least in part, on the identification of the user.

When the adaptive configuration engine 228 automatically adjusts the visual settings and functions of the keys 206 of the keyboard 202 in response to the environmental conditions, the user has an option to modify the currently applied visual settings and functions through the user interface engine 216. In such instances, the user modifies the automatically set visual settings and functions for the detected environmental condition to alternative visual settings and functions that the user desires under the detected environmental conditions. Modifications to the functions and visual settings of the keys made by the user for a given set of environmental conditions may be stored as user modification data 258.

In certain embodiments, the initial neural network 230 used in the keyboard configuration system 212 may be a default neural network provided by a developer, manufacture, supplier, etc., of the keyboard system. In certain embodiments, the user modification data 258 may be used to locally retrain the neural network 230 in response to a predetermined set of conditions. The predetermined set of conditions may be based on an elapsed time since the neural network 230 was last trained, the amount of data accumulated in the user modification data 258, the extent of the differences between the functions and visual settings set by the neural network 230 and the functions and visual settings modified by the user.

Additionally, or in the alternative, the user modification data 258 may be uploaded to a server where it is used to retrain the neural network and download an updated version of the neural network 230 to the keyboard system. In one example, the user modification data 258 for a given keyboard system may be uploaded and processed at a server to provide an updated neural network 230 that is then downloaded to the keyboard system. In another example, the user modification data 258 is gathered from a group of keyboard systems (often having different users) and processed at the server to provide an updated neural network that is then downloaded to the group of keyboard systems. The gathering of the user modification data 258 from one or more keyboard systems may be triggered by an event such as the time elapsed since the last tuning of the neural network model, the amount of modification data available from one or more of the keyboard systems, etc.

As such, the keyboard configuration system 212 may participate in a federated-based learning model in which the keyboard configuration system 212 may perform the partial computation of the AI algorithm locally and transmit the results to a central location using a network port of the IHS 100. The central location, which may be a server computer or distributed computing system, collects such data from a large number of IHS and classifies display settings for keys according to relative levels of user preference, to determine globally optimized default settings. The default settings may apply in all situations, or may be tailored to only some situations (e.g., when particular applications are executing on the IHS 100). The central location may then program or reprogram each individual IHS 100 using those settings whenever the IHS number 100 has connectivity to an appropriate data network, such as the Internet. The IHS 100 may then use those settings advantageously when it lacks such connectivity. Additionally, or in the alternative, the keyboard configuration system may adjust those settings dynamically using local environmental data or user preferences, as described herein.

Figure 3:
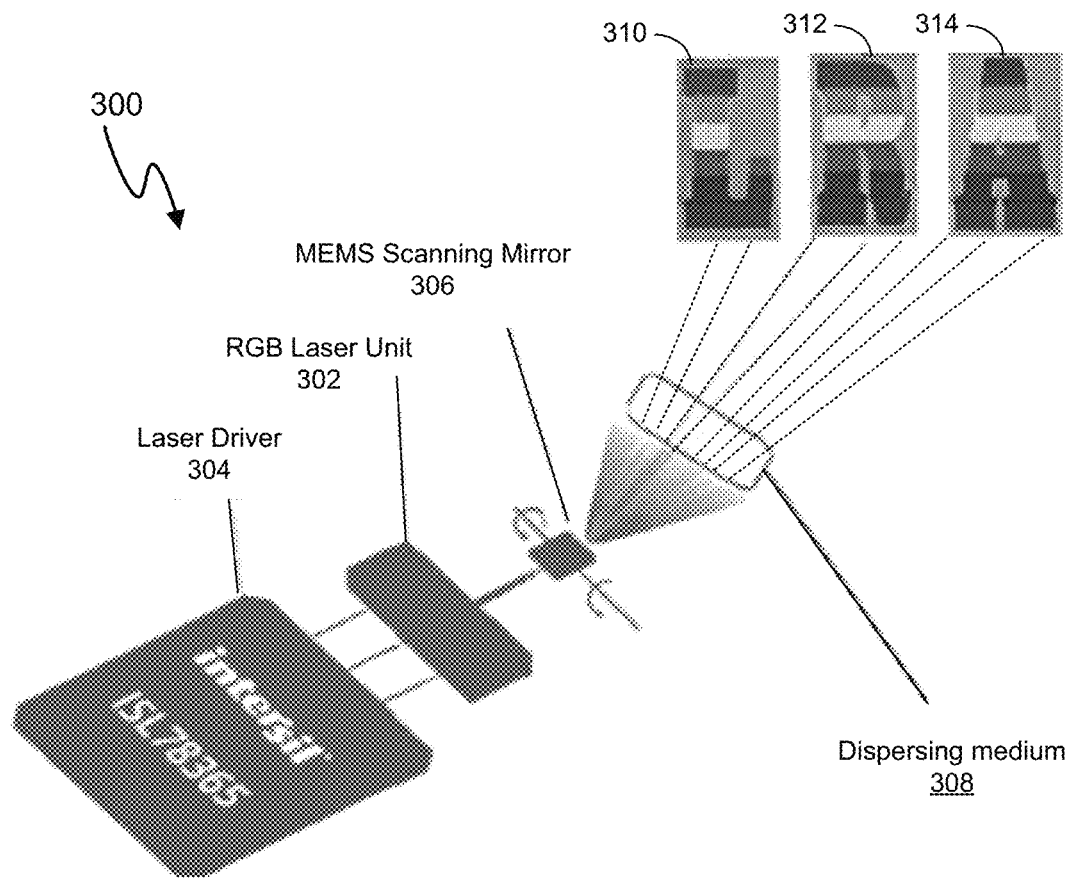
FIG. 3 schematically illustrates the operation of one embodiment of a MEMS laser projector that may be used in certain embodiments of the disclosed system.

FIG. 3 schematically illustrates the components of one embodiment of a MEMS laser projector 300 using laser projection technology for illuminating one or more keys of the keyboard. The components shown in FIG. 3 are merely illustrative of one possible implementation of the concepts, techniques, and structures disclosed herein using commercially available parts. It is appreciated that other designs and implementations may be employed, the implementation shown in FIG. 3 being a non-limiting example.

The illustrative MEMS laser projector 300 includes a laser unit 302 having red, green, and blue (RGB) lasers. The RGB lasers are driven by a Laser Driver 304. The three-color output of the RGB lasers is sent into a MEMS Scanning Mirror 306 to produce a 2D output image of the MEMS laser projector 300. In illustrative embodiments, the Laser Driver 304 and the MEMS Scanning Mirror 306 are controlled by a controller, such as the keyboard interface engine 210 in response to functions and visual settings sent from the keyboard configuration system 212 (see FIG. 2). A dispersing medium 308 takes the 2D output image of the MEMS Scanning Mirror 306 and distributes its portions to a number of different depressible keys for display. Thus, for example, the dispersing medium 308 may include a beam splitter to divide the 2D output image into portions, such as the three portions indicated in FIG. 3 as 310, 312, and 314. The dispersing medium 308 also may include optical waveguides, such as fibers having a surface with high coefficient of reflectivity, to route the portions to keys corresponding to the portions. The dispersing medium 308 also may have lenses to magnify the portions, as required. It is appreciated that other structures may be used in the dispersing medium 308 to accomplish the functions described above. The dispersing medium 308 has fixed optical properties that may be used to configure the MEMS laser projector 300 to produce an output that results in displayed images 310, 312, and 314, that have a high fidelity to idealized images commanded to be displayed by keyboard configuration system.

Figure 4:
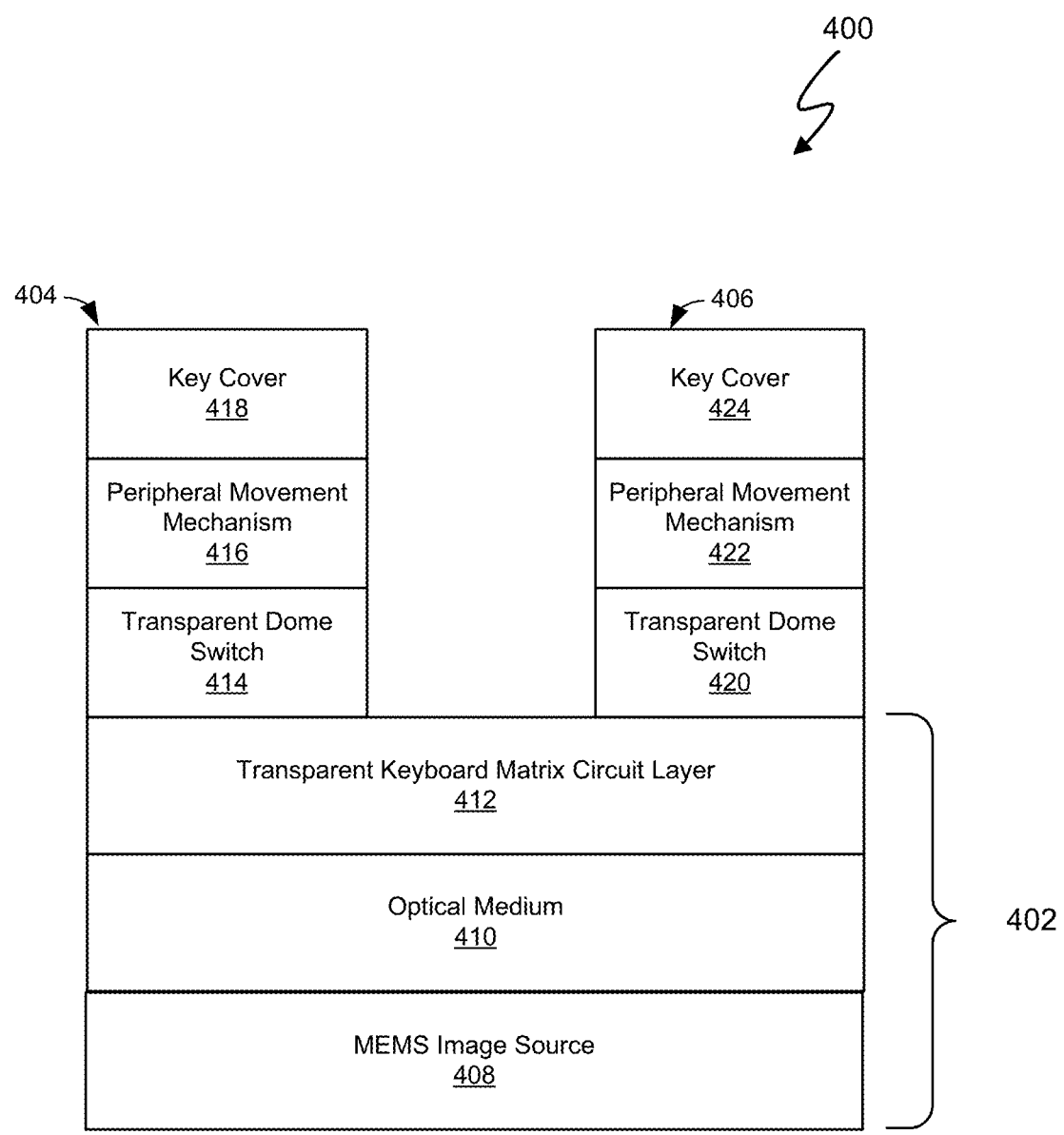
FIG. 4 schematically shows a portion of a keyboard having keys with configurable surface displays.

FIG. 4 schematically shows a portion of a keyboard 400 having keys with configurable surface displays. The keyboard 400 may be the keyboard 122 of FIG. 1. The keyboard 400 includes a substrate 402 and two keys 404 and 406 having identical structures. It is appreciated that in useful embodiments, the keyboard 400 will have many more than two keys, FIG. 4 being merely illustrative.

The substrate 402 includes a MEMS image source 408, an optical medium 410, and a transparent keyboard matrix circuit layer number 412. The MEMS image source 408 may be implemented, for example, as the RGB Laser unit 302 of FIG. 3. The optical medium 410 may be, for example, the dispersing medium 308 of FIG. 3, and receives a 2D output image from the MEMS image source 408. The circuit layer 412 includes circuitry for sensing key presses, as known in the art. The circuit layer 412 is transparent, so that output images (e.g. images 310, 312, and 314 of FIG. 3) may pass into the keys 404 and 406. To the extent that the circuit layer 412 causes any fixed distortion of the output images of the MEMS image source 408, such distortion can be inverted in the optical medium 410 so that an undistorted image is provided to the visible surface of the keys 404 and 406. The key 404 includes a transparent dome switch 414, a peripheral movement mechanism 416, and a translucent key cover 418. The key 406 is identically designed, and includes a transparent dome switch 420, a peripheral movement mechanism 422, and a key cover 424. For simplicity, the purposes of the present disclosure, only the operation of key 404 is discussed since the operation of key 406 is identical. It is appreciated that there are many different possible designs for keys that may use other components (e.g., silicone membrane switches rather than dome switches), and thus FIG. 4 should be viewed as illustrative of only one possible implementation of the concepts, techniques, and structures that may be employed in the disclosed system.

The switch 414 may be formed as a flexible membrane having an electrically conductive pad. When the key 404 is pressed, the pad contacts the circuit layer 412, thereby closing a circuit and causing a "key 404 pressed" signal to be sent to circuitry in the keyboard interface engine of the keyboard 400 (e.g., for encoding the identity of the key for transmission to another part of the computer for processing). When the key 404 is released, the pad breaks contact with the circuit layer 412, thereby opening the circuit. The switch 414 is transparent, allowing images for display on the surface of the key 404 to pass through. To the extent that the switch 414 causes any fixed distortion of the output images of the MEMS image source 408 (e.g., if the dome acts as a lens), such distortion can be inverted in the optical medium 410 so that an undistorted image is provided to the pressable surface of the key 404.

Movement of the switch 414 is controlled by the peripheral movement mechanism 416. This peripheral movement mechanism 416 is peripheral in the sense that its mechanical components are restricted to the periphery of the key 404. Thus, the peripheral movement mechanism 416 may have the shape of two square plastic pieces coupled to each other using plastic butterfly or scissors components on opposing edges, as known in the art. The square pieces contact the transparent dome switch 414 and the translucent key cover 418, respectively, to provide mechanical coupling, while the butterfly component has sufficient key-press resistance and restorative pressure to provide a pleasing and useful haptic feedback to a user pressing the key 44. The peripheral movement mechanism 416 is peripheral so that it does not distort images for viewing on the pressable surface of the key 404. Finally, the key 404 includes a translucent key cover 418. The translucent key cover 418 is transparent or translucent so that images originating in the MEMS image source 408 appear on its visible pressing surface with a high contrast. If the key cover 418 is transparent, the key 404 has a glassy appearance, and the circuit layer 412, the switch 414, and the peripheral movement mechanism 416 may be partially or completely visible. If the translucent key cover 418 is translucent, the underlying mechanism is hidden, although the image projected onto its pressable surface may be slightly diffused, leading to lower image quality. It is appreciated that the designer of the keyboard 400 may choose one type of translucent key cover 418 over the other for any reason, and that any degree of translucence may be used in various embodiments without deviating from the concepts, techniques, and structures disclosed herein.

Figure 5:
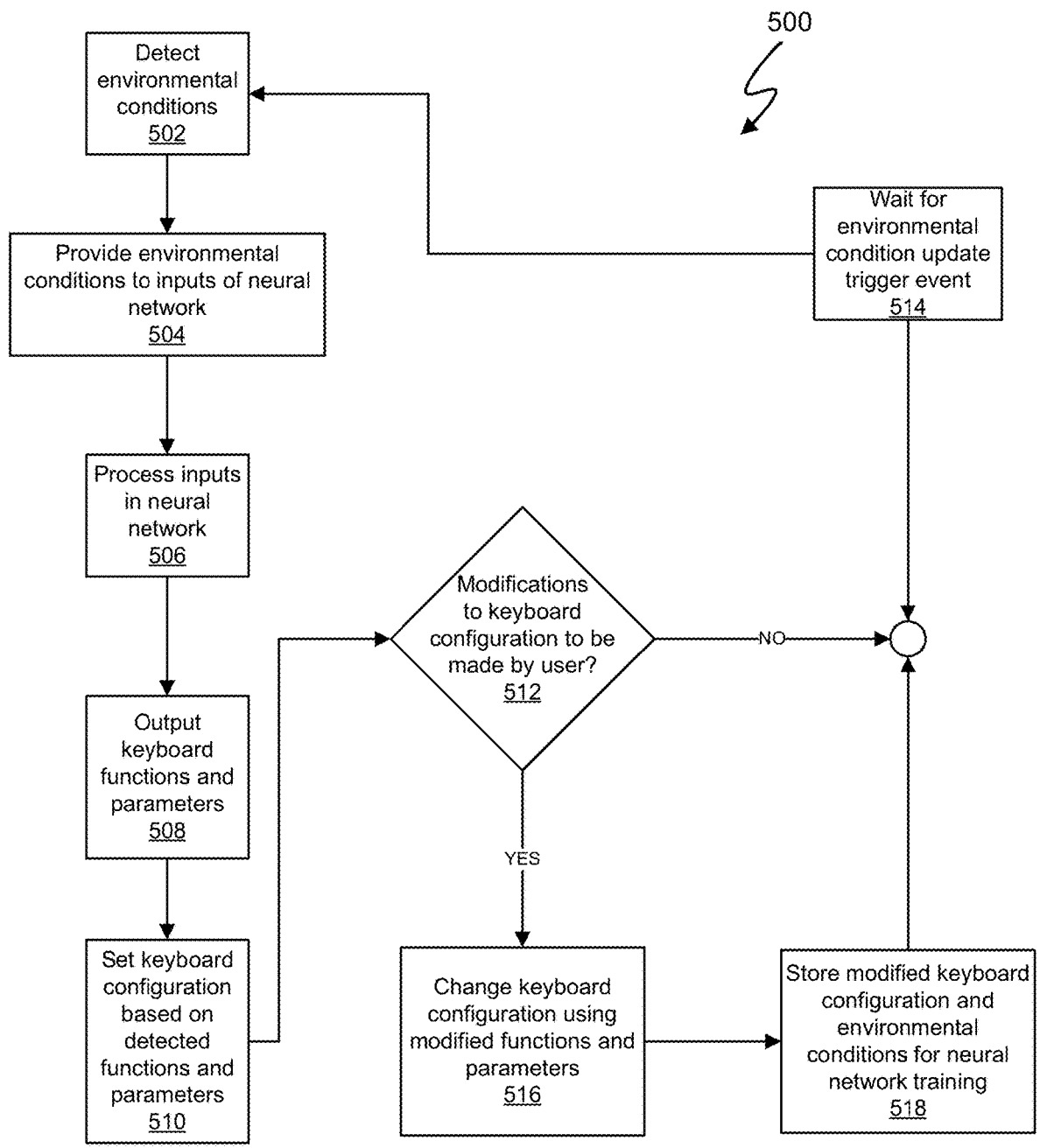
FIG. 5 is a flowchart showing operations that may be executed in certain embodiments of the disclosed system.

FIG. 5 is a flowchart 500 showing operations that may be executed in certain embodiments of the disclosed system. Environmental conditions are detected by one or more subsystems at operation 502. At operation 504, the environmental conditions are converted to one or more vectors in a format that is suitable for provision to the input of a neural network six. At operation 506, the inputs are processed by the neural network, which output of the functions and visual settings that are to be used to configure the keyboard at operation 508. At operation 510, the keyboard configuration is set based on the visual settings and functions output from the neural network and send to control the display and functions of the keys in a light projection technology keyboard.

As noted herein, a user can override the functions and visual settings provided by the neural network. To this end, a determination is made at operation 512 as to whether the user has modified any of the functions and visual settings set up by the neural network. If it is determined that the user has not made any modifications, the flow of operations may continue to operation 514, where the system waits for an environmental condition up the triggering event. The triggering event may include, for example, a timeout, a request from a controller to update the environmental conditions, an interrupt occurring when one of the environmental conditions meets a particular criterion, etc. It will be recognized that other triggering events may be employed, the foregoing merely being non-limiting examples. When a triggering event occurs at operation 514, one or more of the environmental conditions are again detected at operation 502, and another set of keyboard visual settings and functions are provided by the neural network. In certain embodiments, the same set of keyboard visual settings and functions may be provided by the neural network even when some of the environmental conditions have changed. In certain embodiments, the environmental conditions that are again detected at operation 502 may be the same as the environmental conditions occurring before the triggering event. In such instances, the environmental conditions may be ignored or, if provided to the neural network, may result in the same functions and visual settings as previously output from the neural network.

If it is determined at operation 512 that the user wishes to modify the keyboard configuration provided by the neural network, the user may do so at operation 516. At operation 518, the modified keyboard configuration and environmental conditions are stored for subsequent neural network training. As will be discussed herein, the neural network may be tuned locally using the data stored at operation 518. Additionally, on the alternative, the data stored at operation 518 may be provided to a server, which retrains the neural network and downloads the retrained neural network to the keyboard configuration system. In some embodiments, data stored at operation 518 is uploaded to the server from multiple IHS and used to retrain the neural network, which is then downloaded to IHS from which the data stored at operation 518 was obtained.

Figure 6:
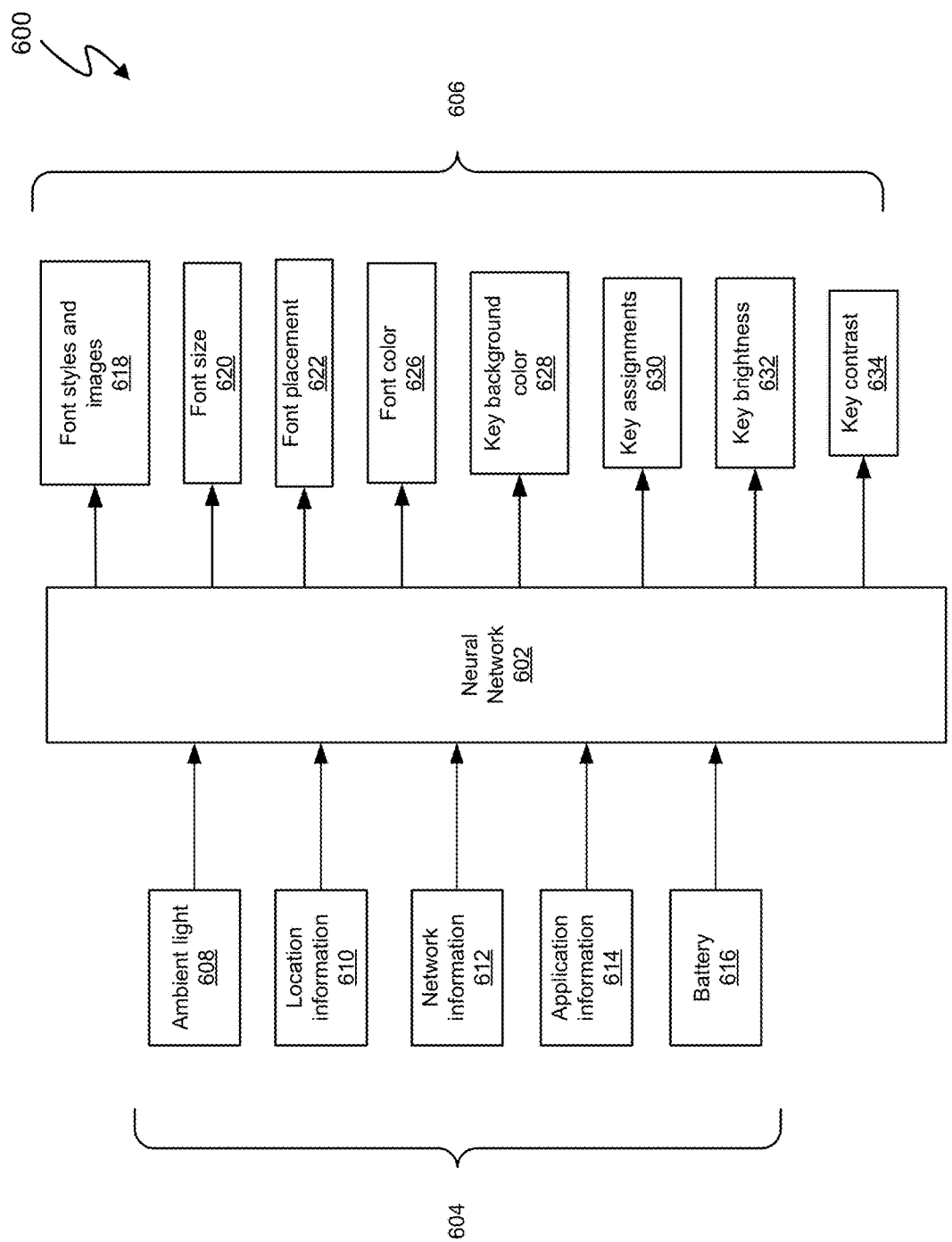
FIG. 6 is a diagram showing an artificial intelligence system having a neural network that may be employed in certain embodiments of the disclosed system.

FIG. 6 is a diagram showing an artificial intelligence system 600 having a neural network 602 that may be employed in certain embodiments of the disclosed system. In this example, the neural network 602 receives data regarding a plurality of environmental condition inputs 604 and outputs visual settings and functions 606 that are to be used by the keyboard configuration system to control the operation and display of the keys of the keyboard.

As shown in FIG. 6, the environmental condition inputs 604 that are used to train and operate the neural network 602 may include ambient light conditions 608, location data 610, network data 612, current application data 614, and battery status 616. In certain embodiments, the ambient light condition data provided to the neural network 602 may include data relating to the main color of the ambient environment, the hue of the environment, the warmth of the light colors in the environment, etc. Such ambient light conditions may be used to optimize the visibility of the visual indicia projected on to the keys of the keyboard.

Certain embodiments of the neural network 602 use the environmental condition inputs 604 to generate a set of keyboard functions and visual setting outputs 606 that are intended to optimize the display of the visual indicia on the keys of the keyboard as well as the functions assigned to the keys of the keyboard. In the example shown in FIG. 6, the neural network identifies fonts styles and images 618 that are to be used as visual indicia on the keys of the keyboard, the font size 620 of the visual indicia, the placement of the font 622 on the keys of the keyboard, the background color 628 for the keys of the keyboard, the key function assignments 630 that are to be assigned to each of the keys of the keyboard, the key brightness 632 for one or both of the visual indicia and/or key background used by each of the keys of the keyboard, and the key contrast 634 defining the contrast between the visual indicia displayed on a key and a corresponding key background. It will be recognized, based on the teachings of the present disclosure, that various environmental conditions and configuration outputs may be used with the neural network 602, the foregoing merely being a non-limiting example.

Figure 7:
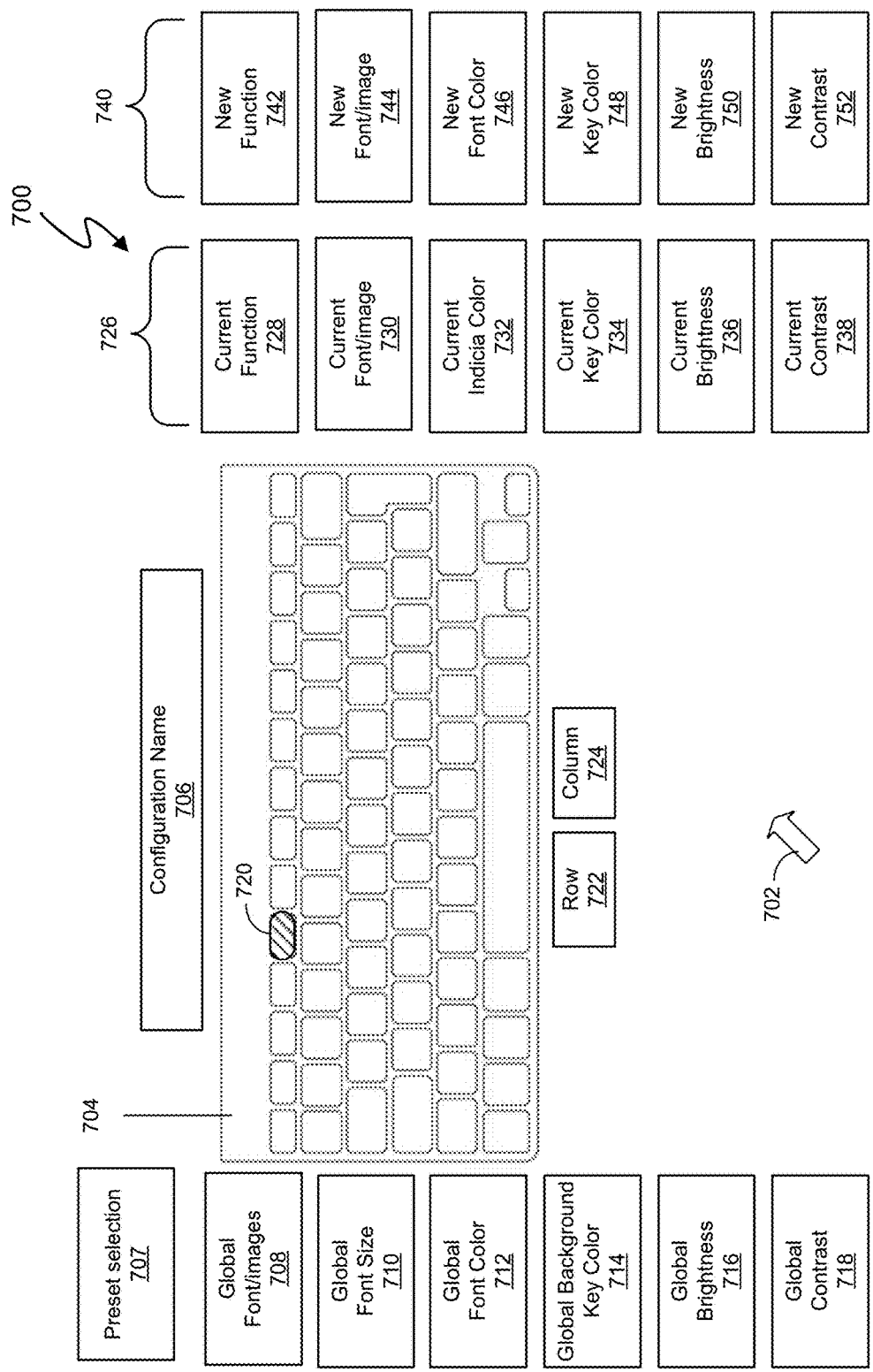
FIG. 7 is a screenshot of a user interface that may be employed to configure the keys of a light projection technology keyboard.

FIG. 7 is a screenshot of a user interface 700 that may be employed to configure the keys of a light projection technology keyboard. Initialization of one or more configuration operations may be implemented, for example, using a mouse and corresponding screen cursor 702. The selection of an object using the screen cursor 702 instantiates a corresponding set of instructions to carry out the operations identified on the face of the object.

In FIG. 7, the user is provided with a display of the layout 704 of the keyboard. The particular layout displayed to the user typically corresponds to the mechanical layout of the corresponding laser projection technology keyboard that is to be configured. In order to keep track of the different configurations, a configuration name may be assigned or otherwise displayed at text object 706. A set of global controls may be provided adjacent a side of the keyboard layout 704. For example, the user may actuate preset selection object 707 to select a global preset configuration for the keyboard. A global font control object 708 may be actuated to run instructions that allow the user to select which set of fonts will be used globally in the keyboard configuration. For example, a user may select whether to display a QWERTY keyboard layout using, for example, a Times New Roman, Helvetica, Arial, etc. font style. A global font-size control 710 may be actuated to run instructions that allow the user to set the font size that is to be displayed on the keys. A global background key color control 714 may be actuated to run instructions that allow the user to set the background color that is to be used with all of the keys of the keyboard.

A global brightness control 716 may be actuated to run instructions that allow the user to set the brightness of the visual indicia and/or background of the keys of the keyboard. A global contrast control 718 may be actuated to run instructions that allow the user to set the contrast between the visual indicia displayed on the keys and the background of the keys. It will be recognized, based on the teachings of the present disclosure, that controls for a different set of global visual settings may be employed, the foregoing being non-limiting examples.

The user interface 700 may also include control objects for assigning specific visual settings and functions to individual keys of the keyboard. To this end, the user may select which key is to be configured using the screen cursor 702. In this example, the user has selected key 720 for configuration. In certain embodiments, the row and column at which the selected key is located are displayed at objects 722 and 724, respectively. Here, key 720 is located in the first row, and fifth column of the keyboard. Additionally, or in the alternative, the user may actuate object 722 and object 724 to run instructions allowing the user to enter the row and column of a key that is to be configured.

To assist the user in making changes to the configuration for a selected key, the user interface 700 may include a column 726 of objects displaying the functions and visual settings associated with the current configuration of the selected key. In this example, the function currently assigned to the key is displayed at object 728. The current visual indicia displayed on the selected key is shown at object 730. The current color of the visual indicia displayed on the selected key is shown at object 732. The current background color of the key is shown at object 734. The current brightness of the selected key is shown at object 736. The current contrast between the visual indicia and the key background is shown at object 738. It will be recognized, based on the teachings of the present disclosure, that the foregoing objects constitute non-limiting examples.

The user interface 700 shown in FIG. 7 also includes a column 740 of objects that may be actuated to modify existing functions and visual settings of the selected key. In this example, the user may actuate object 742 to execute instructions that are used to assign a particular function to the selected key. The user may actuate object 744 to execute instructions that are used to assign the visual indicia that is to be displayed on the surface of the selected key. The user may actuate object 746 to set the color of the visual indicia that is to be displayed on the surface of the selected key. The user may actuate object 748 to set the background color of the selected key. The user may actuate object 750 to set the brightness of the selected key. The user may actuate object 752 to set the contrast between the visual indicia displayed on the key and the background of the key.

In certain embodiments, the functions and visual settings shown in column 726 correspond to the functions and visual settings of the keyboard configuration set by the neural network. In such instances, changes made to the keyboard configuration using the objects of column 740 and the corresponding values may be stored as modifications that are used for retraining the neural network. Similarly, changes to the keyboard configuration set by the neural network using the global controls may also be stored as modifications that are used for retraining the neural network.

Figure 8:
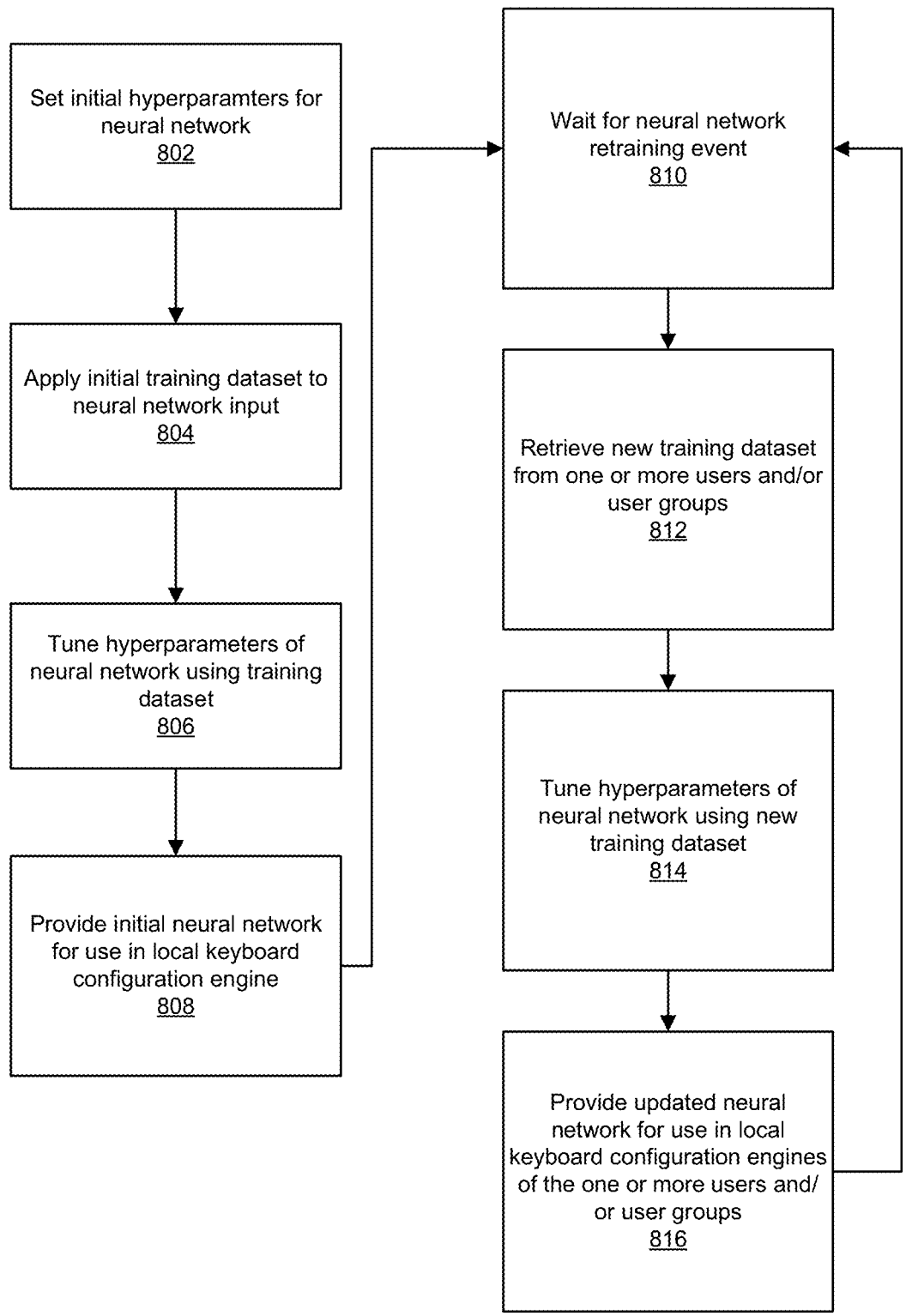
FIG. 8 is a flowchart depicting operations that may be used to tune the neural network in certain embodiments of the disclosed system.

FIG. 8 is a flowchart depicting operations that may be used to tune the neural network in certain embodiments of the disclosed system. An initial neural network is provided for use in the keyboard configuration system. To this end, initial hyperparameters are set for the initial neural network at operation 802. At operation 804, an initial training data set is applied to the input of the neural network. The hyperparameters of the neural network are tuned at operation 806 using the initial training data set, and the initial trained neural network is provided for use in a local keyboard configuration engine at operation 808. At operation 810, certain embodiments wait for a neural network retraining event to occur. Neural network retraining events may include, for example, the elapsed time since the last retraining operation, a periodic timer, the availability of retraining data at one or more of the keyboard configuration engines employed at multiple IHS, etc.

When a retraining event occurs, the neural network is retrained to tune the hyperparameters. To this end, a new training data set is retrieved from one or more users and/or user groups at operation 812. The hyperparameters of the neural network are tuned using the new training data set at operation 814. The updated neural network with the tuned hyperparameters is provided for use in local keyboard configuration engines of the one or more users and/or user groups at operation 816.

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system X210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the descriptions of the disclosed system are intended to be illustrative and should not be taken as limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the disclosed system has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method for operating a light projection technology keyboard of an Information Handling System, the method comprising:
   receiving electronic environmental condition data at a keyboard configuration system, the environmental condition data including one or more of:
      data relating to ambient lighting conditions in an environment in which an Information Handling System using the light projection technology keyboard is operating, wherein the data relating to the ambient lighting conditions is based on light detected by one or more light sensors in an ambient light sensing system;
      data relating to a network environment in which the Information Handling System is operating, wherein the data relating to the network environment is based on a wired network and/or Wi-Fi identifier;
      data relating to identification of a location in which the Information Handling System is operating; and
      data relating to an application actively running on the Information Handling System;
   processing the electronic environmental condition data through a neural network of an adaptive configuration engine, wherein the neural network outputs one or more functions and/or visual settings to be used in configuring operation of the light projection technology keyboard; and
   controlling the light projection technology keyboard based on the one or more functions and/or visual settings output by the neural network.

2. The computer-implemented method of claim 1, wherein the one or more functions and/or visual settings provided by the neural network include two or more of:
   functions assigned to keys of the light projection technology keyboard;
   visual indicia that are to be projected onto visible surfaces of the keys of the light projection technology keyboard;
   placement of the visual indicia projected onto the visible surfaces;
   color of the visual indicia projected onto the visible surfaces;
   background-color projected onto the visible surfaces;
   brightness of the visual indicia and/or key background projected onto the visible surfaces; and
   contrast between the visual indicia projected onto the visible surface and a key background projected onto the visible surfaces.

3. The computer-implemented method of claim 1, wherein
   the keyboard configuration system further includes a user configuration engine, wherein the user configuration engine allows a user to enter functions and/or visual settings of the keys of the light projection technology keyboard.

4. The computer-implemented method of claim 3, wherein the functions and/or visual settings of the keys of the light projection technology keyboard that may be configured by the user include:
   functions assigned to keys of the light projection technology keyboard;
   visual indicia that are to be projected onto visible surfaces of the keys of the light projection technology keyboard;
   placement of the visual indicia projected onto the visible surfaces;
   color of the visual indicia projected onto the visible surfaces;
   background color projected onto the visible surfaces;
   brightness of the visual indicia and/or key background projected onto the visible surfaces; and
   contrast between the visual indicia projected onto the visible surface and a key background projected onto the visible surfaces.

5. The computer-implemented method of claim 4, further comprising:
   modifying the one or more functions and/or visual settings output by the neural network using the user configuration engine; and
   storing the modifications of the one or more functions and/or visual settings made by the user and corresponding environmental conditions in storage media of the Information Handling System.

6. The computer-implemented method of claim 5, further comprising:
   uploading the modifications of the one or more functions and/or visual settings made by the user and corresponding environmental conditions from the Information Handling System to a server;
   tuning the neural network using the modifications and corresponding environmental conditions at the server; and
   downloading the tuned neural network to the Information Handling System for use by the adaptive configuration engine of the keyboard configuration system.

7. The computer-implemented method of claim 1, wherein the electronic environmental condition data further comprises data relating to a battery status of the Information Handling System.

8. A system comprising:
   a processor;
   a data bus coupled to the processor; and
   non-transitory, computer-readable storage medium embodying computer program code, the non-transitory, computer-readable storage medium being coupled to the data bus, the computer program code interacting with a plurality of computer operations and comprising instructions executable by the processor and configured for:
      receiving environmental condition data at a keyboard configuration system of an Information Handling System;
      processing the environmental condition data through a neural network of an adaptive configuration engine, wherein the neural network outputs one or more functions and/or visual settings to be used in configuring operation of a light projection technology keyboard, the one or more functions and/or visual settings provided by the neural network including two or more of:
         functions assigned to keys of the light projection technology keyboard;

visual indicia that are to be projected onto visible surfaces of the keys of the light projection technology keyboard;
placement of the visual indicia projected onto the visible surfaces;
color of the visual indicia projected onto the visible surfaces;
background-color projected onto the visible surfaces;
brightness of the visual indicia and/or key background projected onto the visible surfaces; and
contrast between the visual indicia projected onto the visible surface and a key background projected onto the visible surfaces; and
controlling the light projection technology keyboard based on the one or more functions and/or visual settings output by the neural network.

9. The system of claim 8, wherein the environmental condition data includes one or more of:
data relating to ambient lighting conditions in an environment in which an Information Handling System using the light projection technology keyboard is operating, wherein the data relating to the ambient lighting conditions is based on light detected by one or more light sensors in an ambient light sensing system;
data relating to a network environment in which the Information Handling System is operating, wherein the data relating to the network environment is based on a wired network and/or Wi-Fi identifier;
data relating to identification of a location in which the Information Handling System is operating; and
data relating to an application actively running on the Information Handling System.

10. The system of claim 8, wherein
the keyboard configuration system further includes a user configuration engine, wherein the user configuration engine allows a user to enter functions and/or visual settings of the keys of the light projection technology keyboard.

11. The system of claim 10, wherein the functions and/or visual settings of the keys of the light projection technology keyboard that may be configured by the user include:
functions assigned to keys of the light projection technology keyboard;
visual indicia that are to be projected onto visible surfaces of the keys of the light projection technology keyboard;
placement of the visual indicia projected onto the visible surfaces;
color of the visual indicia projected onto the visible surfaces;
background color projected onto the visible surfaces;
brightness of the visual indicia and/or key background projected onto the visible surfaces; and
contrast between the visual indicia projected onto the visible surface and a key background projected onto the visible surfaces.

12. The system of claim 11, wherein the instructions are further configured for:
modifying the one or more functions and/or visual settings output by the neural network using the user configuration engine; and
storing the modifications of the one or more functions and/or visual settings made by the user and corresponding environmental conditions in storage media of the Information Handling System.

13. The system of claim 12, wherein the instructions are further configured for:

uploading the modifications of the one or more functions and/or visual settings made by the user and corresponding environmental conditions from the Information Handling System to a server;
tuning the neural network using the modifications and corresponding environmental conditions at the server; and
downloading the tuned neural network to the Information Handling System for use by the adaptive configuration engine of the keyboard configuration system.

14. The system of claim 8, wherein the light projection technology keyboard includes one or more keys having a configurable surface display.

15. A non-transitory, computer-readable storage medium embodying computer program code, the computer program code comprising computer executable instructions configured for:
receiving environmental condition data at a keyboard configuration system, the environmental condition data including one or more of:
data relating to ambient lighting conditions in an environment in which an Information Handling System having the light projection technology keyboard is operating, wherein the data relating to the ambient lighting conditions is based on light detected by one or more light sensors in an ambient light sensing system;
data relating to a network environment in which the Information Handling System is operating, wherein the data relating to the network environment is based on a wired network and/or Wi-Fi identifier;
data relating to identification of a location in which the Information Handling System is operating; and
data relating to an application actively running on the Information Handling System;
processing the environmental condition data through a neural network of an adaptive configuration engine of an Information Handling System, wherein the neural network outputs one or more functions and/or visual settings to be used in configuring operation of a light projection technology keyboard; and
controlling the light projection technology keyboard based on the one or more functions and/or visual settings output by the neural network.

16. The non-transitory, computer-readable storage medium of claim 15, wherein the one or more functions and/or visual settings provided by the neural network include two or more of:
functions assigned to keys of the light projection technology keyboard;
visual indicia that are to be projected onto visible surfaces of the keys of the light projection technology keyboard;
placement of the visual indicia projected onto the visible surfaces;
color of the visual indicia projected onto the visible surfaces;
background color projected onto the visible surfaces;
brightness of the visual indicia and/or key background projected onto the visible surfaces; and
contrast between the visual indicia projected onto the visible surface and a key background projected onto the visible surfaces.

17. The non-transitory, computer-readable storage medium of claim 15, wherein
the keyboard configuration system further includes a user configuration engine, wherein the user configuration engine allows a user to enter functions and/or visual settings of the keys of the light projection technology keyboard.

18. The non-transitory, computer-readable storage medium of claim 17, wherein the functions and/or visual settings of the keys of the light projection technology keyboard that may be configured by the user include:
functions assigned to keys of the light projection technology keyboard;
visual indicia that are to be projected onto visible surfaces of the keys of the light projection technology keyboard;
placement of the visual indicia projected onto the visible surfaces;
color of the visual indicia projected onto the visible surfaces;
background color projected onto the visible surfaces;
brightness of the visual indicia and/or key background projected onto the visible surfaces; and
contrast between the visual indicia projected onto the visible surface and a key background projected onto the visible surfaces.

19. The non-transitory, computer-readable storage medium of claim 18, wherein the instructions are further configured for:
modifying the one or more functions and/or visual settings output by the neural network using the user configuration engine; and
storing the modifications of the one or more functions and/or visual settings made by the user and corresponding environmental conditions in storage media of the Information Handling System;
uploading the modifications of the one or more functions and/or visual settings made by the user and corresponding environmental conditions from the Information Handling System to a server;
tuning the neural network using the modifications and corresponding environmental conditions at the server; and
downloading the tuned neural network to the Information Handling System for use by the adaptive configuration engine of the keyboard configuration system.

20. The non-transitory, computer-readable storage medium of claim 15, wherein the application actively running on the Information Handling System comprises a game actively running on the Information Handling System.

* * * * *